United States Patent [19]

Sasaki et al.

[11] Patent Number: 5,094,916

[45] Date of Patent: Mar. 10, 1992

[54] MAGNETIC RECORDING MEDIUM COMPRISING A POLYURETHANE BINDER RESIN HAVING A SPECIFIED GLASS TRANSITION, MOLECULAR WEIGHT, AND POLAR GROUP CONTENT

[75] Inventors: Kunitsuna Sasaki; Kiyoshi Sawada; Ryosuke Isobe; Takahiro Mori; Yuki Ando, all of Hino, Japan

[73] Assignee: Konica Corporation, Tokyo, Japan

[21] Appl. No.: 629,464

[22] Filed: Dec. 18, 1990

[30] Foreign Application Priority Data

Dec. 28, 1989 [JP] Japan .................................. 1-339749

[51] Int. Cl.$^5$ ................................................ G11B 5/00
[52] U.S. Cl. .............................. 428/425.9; 428/424.6; 428/694; 428/900
[58] Field of Search ................ 428/900, 694, 424.6, 428/425.9

[56] References Cited

U.S. PATENT DOCUMENTS 4,634,633 1/1987 Ninomiya et al. ............... 428/425.9

Primary Examiner—Merrell C. Cashion, Jr.
Assistant Examiner—Stevan A. Resan
Attorney, Agent, or Firm—Jordan B. Bierman

[57] ABSTRACT

A magnetic recording medium is disclosed which has a magnetic layer comprising a ferromagnetic powder and a specific polyurethane resin as a binder. The polyurethane resin has a weight average molecular weight of not more than 30,000, a glass transition point of not higher than 0° C. and a $-SO_3M$ group, wherein M is a hydrogen atom or an alkali metal atom, in an amount of not less than 0.35% by weight in terms of sulfur atom. The recording medium is excellent in the dispersibility of the magnetic powder in the binder and has high running stability.

5 Claims, 1 Drawing Sheet

MAGNETIC RECORDING MEDIUM COMPRISING A POLYURETHANE BINDER RESIN HAVING A SPECIFIED GLASS TRANSITION, MOLECULAR WEIGHT, AND POLAR GROUP CONTENT

FIELD OF THE INVENTION

The present invention relates to a magnetic recording medium such as a magnetic tape and a magnetic disk.

BACKGROUND OF THE INVENTION

In general, a magnetic recording medium such as a magnetic tape is produced by coating and drying a magnetic paint comprising a ferromagnetic powder and a binder on a nonmagnetic support.

In a magnetic recording medium, particularly a magnetic recording medium for video use which requires a high-frequency recording, there has lately been a demand for increasing the recording density. With the demand for higher-density recording, a further finer particulate and high-coercive ferromagnetic powder having a specific surface area of 45 m$^2$/g has come into use.

However, as the ferromagnetic powder becomes finer particulate and highly coercive, its individual particles are liable to strongly aggregate, which makes it difficult to provide any sufficient dispersibility and surface smoothness necessary for obtaining a high reproduction output and good S/N ratio in the high-frequency recording. This tendency is remarkable particularly in a ferromagnetic metal powder.

With the recent development of high-functional video tape recorders, most of them are now of the multihead type, which causes a jitter broblem called head rapping, so that there has been a strong demand for the stabilization of video tape running.

Under such circumstances, many attempts have now been made to improve magnetic recording mediums by removing therefrom their shortcoming that making a ferromagnetic powder fine particulate reduces its dispersibility. For example, Japanese Patent Publication Open to Public Inspection (hereinafter referred to as Japanese Patent O.P.I. Publication) No. 57527/-1985 discloses techniques for improving the dispersibility of a ferromagnetic powder by incorporating into the magnetic layer a modified polyurethane containing a functional group selected from the group consisting of a carboxyl group, hydroxyl group, sulfonic acid group and epoxy group.

According to our investigation, however, only the use of a polyurethane containing a polar functional group, even though it can improve the dispersibility of the magnetic powder, have difficulty in obtaining a tape run stable enough to restrain the head rapping.

SUMMARY OF THE INVENTION

It is an object of the present invention to provide a magnetic recording medium which contains a ferromagnetic metal powder having an excellent dispersibility and has an excellent running stability.

The present invention relates to a magnetic recording medium which comprises a ferromagnetic powder and a binder, in which said binder is a polyurethane having a glass transition point of not more than 0° C., a weight average molecular weight of not more than 30,000, and a polar group —SO$_3$M, wherein M is a hydrogen atom or an alkali metal atom such as Na, K and Li, and the polar group content is 0.35% by weight of the polyurethane in terms of sulfur atom.

BRIEF DESCRIPTION OF THE DRAWING

The accompanying drawing is an enlarged cross-sectional view of an example of the magnetic recording medium of the invention.

DETAILED DESCRIPTION OF THE INVENTION

Figure 1:
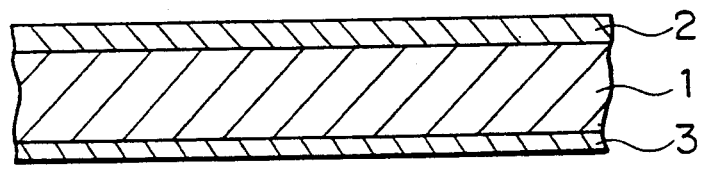

In the invention, a fine particulate ferromagnetic powder can be sufficiently dispersed because the polyurethane used has a weight average molecular weight of not more than 30,000 and contains a polar group —SO$_3$M of which the S atom content is not less than 0.35% by weight of the polyurethane.

That is, if the weight average molecular weight of the polyurethane exceeds 30,000, the molecular weight is too large to disperse the magnetic powder, so that the molecular weight should be not more than 30,000, and more preferably 20,000 to 28,000. The —SO$_3$M component of the polyurethane is well adaptable to the ferromagnetic powder and therefore have the effect of accelerating the dispersion of the powder in the polyurethane. Accordingly, the —SO$_3$M group's S atom content less than 0.35% by weight of the polyurethane is ineffective, so that it should be not less than 0.35% by weight, and more preferably 0.35 to 0.50% by weight.

If the glass transition point (Tg) of the polyurethane is more than 0° C., then the stiffness of the magnetic layer increases to affect the tape running stability, so that Tg should be not more than 0° C., and preferably $-10°$ to $-50°$ C. That is, the polyurethane of the invention, since its glass transition point is not more than 0° C., can restrain the head rapping to improve the running stability.

The reason for restraining the head rapping to improve the tape running stability is probably because the polyurethane's glass transition point lower than 0° C. can lower the stiffness of the tape to thereby lessen the shock which the head undergoes when leaving the outlet of the drum. Usually, to lower the tape stiffness is to reduce the tape strength, but because the polyurethane of the invention contains —SO$_3$M, the ferromagnetic powder and the polyurethane so strongly adsorb each other as to prevent the tape strength from lowering.

As the ferromagnetic powder in the invention, those usually employed for conventional magnetic recording medium may be used, which include oxidated magnetic compounds such as $\gamma$-Fe$_2$O$_3$, Co-containing $\gamma$-Fe$_2$O$_3$, Co-adhered $\gamma$-Fe$_2$O$_3$, Fe$_3$O$_4$, Co-containing Fe$_3$O$_4$, Co-adhered Fe$_3$O$_4$, Co-containing magnetic FeOx ($3/2 > X > 4/3$) and CrO$_2$. A hexagonal ferrite such as barium ferrite and iron nitride may also be used.

Examples of the ferromagnetic metal powder include Fe, Ni, Co, and metallic powders comprised principally of Fe, Ni and Co, such as Fe-Al, Fe-Al-Ni, Fe-Al-Zn, Fe-Al-Co, Fe-Ni, Fe-Ni-Al, Fe-Ni-Co, Fe-Ni-Si-Al-Mn, Fe-Ni-Si-Al-Zn, Fe-Al-Si, Fe-Al-Ca, Fe-Ni-Zn, Fe-Ni-Mn, Fe-Ni-Si, Fe-Mn-Zn, Fe-Co-Ni-P and Co-Ni powders. Among these powders, the Fe-type metallic powders are excellent in the electric characteristics, and preferred among them from the corrosion resistance and dispersibility points of view are the Fe-Al, Fe-Al-Ni, Fe-Al-Zn, Fe-Al-Co, Fe-Ni, Fe-Ni-Al, Fe-Ni-Zn, Fe-Ni-Al-Si-Zn, Fe-Ni-Al-Si-Mn and Fe-Ni-Co powders.

The ferromagnetic metal powder is more preferably of a structure in which the Fe:Al content ratio by the number of atoms is 100:1 to 100:20, and the Fe and Al atoms which are present in the surface area of not more than 100 Å at the depth of an ESCA analysis is in the Fe:Al content ratio by the number of atoms of 30:70 to 70:30. The ferromagnetic powder also preferably contains Fe, Ni, Al and Si atoms, and more preferably additionally contains at least one of Zn and Mn atoms, wherein the Fe content is not less than 90 atom %, the Ni content is 1 to 10 atom %, the Al content is 0.1 to 5 atom %, the Si content is 0.1 to 5 atom %, the Zn content and/or Mn content (total content when both are contained) is 0.1 to 5 atom %, and the Fe, Ni, Al, Zn and/or Mn atoms which are present in the surface area of not more than 100 AA at the depth of the ESCA analysis of the above ferromagnetic powder are in the Fe:NI:Al:Si:Zn and/or Mn content ratio of 100:4 or less:10-60:10-70:20-80.

In the invention, a ferromagnetic powder having a specific surface area of not less than 45 m²/g is preferably used for a high recording density.

The specific surface area of the ferromagnetic powder in the invention is defined by expressing in terms of square meters the surface area per gram measured according to a specific surface area measuring method called BET method. The specific surface area and the measuring method therefor are detailed in the Measurement of Powders by J. M. Dallavalle, Clyderr Jr., and the Kagaku Benran (Handbook of Chemistry), Application Section, pp.1170–1171, compiled by the Chemical Society, Japan. The measurement of the specific surface area may be carried out, for example, in the manner that a ferromagnetic powder is subjected to heat treatment at around105° C. for 13 minutes for deaeration and removal of impurities therefrom, and then conducted into a measuring instrument, wherein the initial pressure of nitrogen is set at 0.5 kg/m², and an absorption measurement is made with nitrogen for 10 minutes at a liquid nitrogen temperature of −195° C. As the measuring instrument a Quantasorb, manufactured by Yuasa Ionics Co., may be used.

The binder in the invention, as mentioned above, contains a polyurethane having a glass transition point of not more than 0° C., a weight average molecular weight of not more than 30,000 and containing a polar group —SO₃M of which the S atom content is not less than 0.35% by weight of the polyurethane.

The above S atom content is found in the following manner: To a matrix resin are added with shaking prescribed amounts of a P-containing compound as an internal standard substance and sulfur having a purity of 99.9999%, and the mixture is subjected to WDX (wavelength dispersion-type fluorescent X-ray) to obtain a fluorescent X-ray strength ratio of S:P to thereby prepare a calibration curve for the S atom content, and then to a sample for measurement is added a prescribed amount of the P-containing compound for WDX measurement.

Next, the synthesis of the polyurethan of the invention is described. For the synthesis of the polyurethane there may be used the reaction of a polyol and a polyisocyanate, which are a method generally used. The polyol component used is a polyester polyol that is obtained by the reaction of a polyol and a polybasic acid. In this known method, as a part of the polybasic acid, a polybasic acid having the foregoing polar group is used, whereby a polar group-having polyester polyol can be synthesized.

Examples of the polybasic acid include phthalic acid, isophthalic acid, terephthalic acid, adipic acid, azelaic acid, sebacic acid and maleic acid. Examples of the polybasic acid having a polar group include 5-sulfoisophthalic acid, 2-sulfoisophthalic acid, 4-sulfoisophthalic acid, 3-sulfophthalic acid, 5-sulfoisophthalic acid alkyl, 2-sulfoisophthalic acid dialkyl, 4-sulfoisophthalic acid alkyl, 3-sulfophthalic acid dialkyl and the sodium and potassium salts thereof. Examples of the polyol include trimethylolpropane, hexanetriol, glycerol, trimethylolethane, neopentylglycol, pentaerythritol, ethylene glycol, propylene glycol, 1,3-butanediol, 1,4-butanediol, 1,6-hexanediol, diethylene glycol and cyclohexane dimethanol.

Different other polar group-introduced polyester polyols may also be synthesized by the known method.

If the above polar group-having polyester polyol is utilized as a raw material, the polyurethane having a polar group can be synthesized. Examples of the polyisocyanate component include diphenylmethane-4,4'-diisocyanate (MDI), hexamethylenediisocyanate (HMDI), tolylenediisocyanate (TDI), 1,5-naphthalenediisocyanate (NDI), tolidinediisocyanate (TODI) and lysineisocyanate methyl ester (LDI).

The polyurethane can also be synthesized otherwise by the addition reaction of a polyurethane having a OH group and one of the following compounds each having a polar group and a chlorine atom:

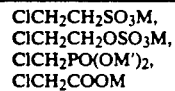

ClCH₂CH₂SO₃M,
ClCH₂CH₂OSO₃M,
ClCH₂PO(OM')₂,
ClCH₂COOM

Descriptions relating to the introduction of a polar group into the polyurethane are found in Japanese Patent Examined Publication No. 41565/1873, Japanese Patent O.P.I. Publication Nos. 92422/1982, 92423/1982, 8127/1984, 5423/1984, 5424/1984 and 121923/1987, which are useful for the invention.

As the binder, in addition to the above resins there may also be used the following resins:

Examples thereof are those having a weight average molecular weight of 10,000 to 200,000, which include vinyl chloride copolymer, vinyl chloride-vinyl acetate copolymer, vinyl chloride-vinylidene chloride copolymer, vinyl chloride-acrylonitrile copolymer, butadiene-acrylonitrile copolymer, polyamide resin, polyvinyl butyral, cellulose derivatives such as nitrocellulose, styrene-butadiene copolymer, various synthetic rubber resins, phenol resin, epoxy resin, urea resin, melamine resin, phenoxy resin, silicone resin, acryl resin and urea-formamide resin. Above all, vinyl chloride-type copolymers may be preferably used in combination with the foregoing polyurethane.

The binder content of the magnetic layer is normally in the range of 10 to 40 parts by weight, and preferably 15 to 30 parts by weight to 100 parts by weight of the magnetic powder. The using amount ratio by weight of the polyurethane of the invention and other binder resin is normally 90:10 to 10:90, and preferably 70:30 to 30:70.

The magnetic layer of the invention may preferably contain a polyisocyanate in order to improve the durability thereof. A usable aromatic polyisocyanate is, e.g., an adduct of tolylenediisocyanate (TDI) with an active hydrogen compound. A useful aliphatic polyisocyanate is an adduct of hexamethylenediisocyanate (HMDI) with an active hydrogen compound. The weight average molecular weight of the polyisocyanate is preferably in the range of 100 to 3,000.

In forming the above magnetic layer, there may, if necessary, be added additives such as a dispersing agent, a lubricant, an abrasive, an antistatic angent and a filler.

Useful examples of the dispersing agent include fatty acids having 12 to 18 carbon atoms such as caprylic acid, capric acid, lauric acid, myristic acid, palmitic acid, stearic acid, oleic acid, and alkali metal salts or alkaline earth metal salts and amides thereof: polyalkylene-oxide-alkyl phosphates; lecithin; trialkyl-polyolefinoxy quaternary ammonium salts; and azo compounds having carboxyl and sulfon acid groups. These dispersing agents may be used in the range of 0.5 to 5% by weight to the magnetic powder.

As the lubricant, a fatty acid and/or a fatty acid ester may be used. In this instance, the adding amount of the fatty acid is preferably 0.2 to 10% by weight, and more preferably 0.5 to 5% by weight. The adding amount of the fatty acid ester is preferably 0.2 to 10% by weight, and more preferably 0.5 to 5% by weight. To make the above effects better, the ratio by weight of the fatty acid : the fatty acid ester is preferably 10:90 to 90:10.

The fatty acid may be either a monobasic acid or a dibasic acid and has preferably 6 to 30 carbon atoms, and more preferably 12 to 22 carbon atoms. Examples Of the fatty acid include caproic acid, caprylic acid, capric acid, lauric acid, myristic acid, palmitic acid, stearic acid, isostearic acid, linolenic acid, linolic acid, oleic acid, elaidic acid, behenic acid, malonic acid, succinic acid, maleic acid, glutaric acid, adipic acid, pimelic acid, azelaic acid, sebacic acid, 1,12-dodecanedicarboxylic acid and octanedicarboxylic acid.

Examples of the fatty acid ester include oleyl oleate, isocetyl stearate, dioleyl maleate, butyl stearate, butyl palmitate, butyl myristate, octyl myristate, octyl palmitate, pentyl stearate, pentyl palmitate, isobutyl oleate, stearyl stearate, lauryl oleate, octyl oleate, isobutyl oleate, ethyl oleate, isotridecyl oleate, 2-ethylhexyl stearate, ethyl stearate, 2-ethylhexyl palmitate, isopropyl palmitate, isopropyl myristate, butyl laurate, cetyl-2-ethyl caproate, dioleyl adipate, diethyl adipate, diisobutyl adipate, diisodecyl adipate, oleyl stearate, 2-ethylhexyl myristate, isopentyl palmitate, isopentyl stearate, diethylene glycol-monobutyl-ether palmitate and diethylene glycol-monobutyl-ether palmitate.

Besides the above fatty acids and fatty acid esters, to the magnetic layer may also be added other lubricants such as silicone oil, graphite, carbon fluoride, molybdenum disulfide, tungsten disulfide, fatty acid amides and α-olefin oxide.

Examples of the abrasive include α-alumina, fused alumina, chromium oxide, titanium oxide, α-iron oxide, silicon oxide, silicone nitride, silicon carbide, molybdenum carbide, tungsten carbide, boron carbide, corundum, zirconium oxide, zinc oxide, cerium oxide, magnesium oxide and boron nitride. The average particle size of these abrasives is preferably 0.05 to 0.6 μm, and more preferably 0.1 to 0.3 μm. Examples of the antistatic agent include conductive powders such as carbon black and graphite; cationic surfactants such as quaternary amines; anionic surfactants containing acid groups such as of sulfonic acid, sulfuric acid, phosphoric acid, phosphates and carboxylic acid; amphoteric surfactants such as aminosulfonic acids; and natural surfactants such as saponin. Any of the above antistatic agents may be added in the range of normally 0.01 to 40% by weight to the binder.

A solvent is used in preparation of a magnetic paint for the formation of the above magnetic layer. Examples of the solvent include ketones such as acetone, methylethyl ketone, methylisobutyl ketone and cyclohexanone; aromatic hydrocarbons such as benzene, toluene and xylene; alcohols such as methanol, ethanol, propanol and butanol; esters such as methyl acetate, ethyl acetate and butyl acetate; cyclic ethers such as tetrahydrofuran: and halogenated hydrocarbons such as methylene chloride, ethylene chloride, carbon tetrachloride, chloroform and dichlorobenzene.

The magnetic paint used in the invention is prepared by kneading and dispersing in a solvent the magnetic powder, binder, dispersing agent, lubricant, abrasive and antistatic agent. The kneading and dispersion of the magnetic powder are carried out in a kneader-disperser. Examples of the kneader-disperser include a biroll mill, triroll mill, ball mill, tron mill, pebble mill, coboll mill, sand mill, sand grinder, Szegvari attritor, high-speed impeller disperser, high-speed impact mill, high-speed stone mill, disper, high-speed mixer, homogenizer, ultrasonic disperser, oven kneader, continuous kneader and pressure kneader.

Examples of the nonmagnetic support used in the invention include polyesters such as polyethylene terephthalate and polyethylene-2,6-naphthalate; polyolefins such as polypropylene; cellulose derivatives such as cellulose diacetate and cellulose triacetate; polycarbonate and polyamide.

The magnetic recording medium of the invention, as shown in the drawing, is of a construction comprising a nonmagnetic support 1 made of, e.g., polyethylene terephthalate, a magnetic layer provided thereon and, if necessary, a backing layer provided on the opposite side to the layer 2. Further, on the magnetic layer 2 may be provided an overcoat layer (OC layer). Also, an undercoat layer (UC layer) may be provided between the magnetic layer and the support. The nonmagnetic support may be subjected to corona discharge treatment.

For forming the above magnetic layer on the nonmagnetic support may be used any one of the following coating methods: air-doctor coating, air-knife coating, blade coating, squeeze coating, impregnation coating, transfer coating, reverse-roll coating, kiss coating, gravure coating, cast coating and spray coating.

The magnetic layer coated on the nonmagnetic support is dried with magnetic field orientation, and then calandered for surface smoothing treatment. After that, the layer, if necessary, is varnished or subjected to blade treatment and then slit.

The present invention is applicable to magnetic tapes, magnetic disks, and the like.

EXAMPLES

In the following examples, the 'parts' all represents parts by weight.

EXAMPLE 1

The following composition was dispersed by kneading with a ball mill for 24 hours; filtered through a 0.5 μm filter; 5 parts of a polyfunctional isocyanate Coronate L, manufactured by Nippon Polyurethane Co., were added thereto; then the prepared magnetic paint was coated so as to form a layer 2.5 μm in thickness on a nonmagnetic support and dried while being oriented by a 4,000-gauss magnet; and then subjected to supercalender treatment.

| Ferromagnetic composition | |
|---|---|
| Ferromagnetic metal powder (Fe/Al ratio by weight: 95/5 Hc: 1580 Oe, σs: 120 emu/g BET specific surface area: 55.5 m²/g) | 100 parts |
| Vinyl chloride copolymer (VAGH, produced by UCC) | 12 parts |
| Polyurethane | 8 parts |
| α-Alumina (average particle size: 0.2 μm) | 8 parts |
| Carbon black (average particle size: 55 nm BET specific surface area: 32 m²/g DBP oil absorption: 180 ml/100 g) | 0.5 part |
| Oleic acid | 1 part |
| Stearic acid | 1 part |
| Butyl stearate | 1 part |
| Cyclohexanone | 100 parts |
| Methylethyl ketone | 100 parts |
| Toluene | 100 parts |

The above polyurethane is one that is synthesized in accordance with the following method:

Polyurethane

In a polymerization reactor were put 280 g of dimethyl 5-sodium-sulfonisophthalate, 944 g of 1,6-hexanediol, 416 g of neopentyl glycol, 0.45 g of zinc acetate and 0.06 g of sodium acetate, and the reaction took place at 140° to 220° C. for two hours. Next, 918 g of adipic acid were added to make another reaction for two hours: the reaction system was decompressed spending 30 minutes down to 20 mmHg; then further down to 5 to 20 mmHg; and the polymerization reaction thereof was made under the reduced pressure at 250° C. for 50 minutes to thereby synthesize a polyester polyol comprised in combination in a molar ratio of dimethyl 5-sodium-sulfoisophthalate: adipic acid: 1,6-hexanediol: neopentyl glycol=5.3:42.8:34.2:17.7.

Subsequently, in a reactor the reaction of 500 g of the above polyester polyol, 600 g of toluene, 450 g of methylisobutyl ketone, 35 g of diphenylmethanediisocyanate and 0.5 g of dibutyl tin-dilaurate took place at 70° to 90° C. for 8 hours to thereby prepare a polyurethane. The obtained polyurethan contains 0.3 mole polymerized dimethyl 5-sodium-sulfoisophthalate; has a glass transition point of −20° C. and a weight average molecular weight of 25,000; and contains a polar group —SO$_3$Na in an amount of the S atom of 0.38% by weight of the polyurethane.

After that, a paint having the following composition was coated to form a backcoat layer 0.8 μm in thickness on the opposite side of the support to the magnetic layer, and the film was slit into 8 mm-wide tapes, whereby an 8 mm video tape sample was prepared.

| | |
|---|---|
| Carbon black (average particle size: 50 nm) | 40 parts |
| Barium sulfate | 10 parts |
| Nitrocellulose | 25 parts |
| N-2301 (produced by Nippon Polyurethane) | 25 parts |
| Coronate L (produced by Nippon Polyurethane) | 10 parts |
| Cyclohexanone | 400 parts |
| Methylethyl ketone | 250 parts |
| Toluene | 250 parts |

EXAMPLES 2 TO 5, COMPARATIVE EXAMPLES 1 TO 3

The 8 mm video tape samples for Examples 2 to 5 and Comparative Examples 1 to 3 were prepared in the same manner as in Example 1 except that a part of the adipic acid used in the synthesis of the polyurethane in Example 1 was replaced by isophthalic acid, and those polyurethanes obtained by changing the glass transition point to −10° to 20° C. were used, provided that the glass transition point was controlled by changing the using amount of isophthalic acid (the larger the using amount, the higher the Tg).

EXAMPLES 6 AND 7, COMPARATIVE EXAMPLES 4 AND 5

The 8 mm video tape samples for Examples 6 and 7 and Comparative Examples 4 and 5 were prepared in the same manner as in Example 1 except that the weight average molecular weight of the polyurethane was varied by controlling the polymerizing time in the synthesis process of Example 1.

EXAMPLES 8 AND 9, COMPARATIVE EXAMPLES 6 TO 8

The 8 mm video tape samples for Examples 8 and 9 and Comparative Examples 6 to 8 were prepared in the same manner as in Example 1 except that the proportion of the S atom of the —SO$_3$Na group of the polyurethane was varied by controlling the using amount of the dimethyl 5-sodium-sulfoisophthalate in the synthesis process of Example 1.

EXAMPLE 10

The 8 mm video tape sample for Example 11 was prepared in the same manner as in Example 1 except that the polar group —SO$_3$Na of the polyurethane of Example 1 was replaced by —SO$_3$K; dimethyl 5-potassium-sulfoisophthalate.

EXAMPLE 11

The 8 mm video tape sample for Example 11 was prepared in the same manner as in Example 1 except that the polar group —SO$_3$Na of the polyurethane of Example 1 was replaced by —SO$_3$H; dimethyl 5-sulfoisophthalate.

Each of the above video tape samples was subjected to measurements for the glass transition point Tg and the S atom content of the polyurethane, head rapping, and squareness ratio in the following manners. The results are shown in the following table.

Tg Of The Polyurethane

A temperature at the flection point of the tan δ measured with a dynamic viscoelasticity terster RHEOVIBRON DDV-II-EA, manufactured by Toyo Baldwin Co.

S Atom Content Of The Polyurethane

To a matrix resin were added with shaking prescribed amounts of a P-containing compound as an internal reference material and sulfur having a purity of 99.9999%, and the mixture was subjected to WDX to obtain a fluorescent X-ray strength ratio of S and P to prepare a calibration curve for the S atom con then to a sample for measurement was added a prescribed amount of the P-containing compound for WDX measurement, whereby the S atom content was found.

Head Rapping

A Hi-8VTR CCD-V900, manufactured by Sony Corp., was used to record a grid pattern by using a NTSC PATTERNGENERATOR LCG-401, manufactured by Reader Electronics Co., and the recorded pattern image was reproduced on a 20-inch monitor screen. The width of the crookedness of the vertical line that appeared on the lower part of the reproduced picture was measured.

Squareness Ratio

Proportion of the residual magnetic flux density to the saturated magnetic flux density was measured with a VSM-3S, manufactured by Toei Industry Co.

|  | Tg of Polyurethane | WAMW* of polyurethan | —SO₃M group's S content of polyurethane | Head rapping | Squareness ratio |
|---|---|---|---|---|---|
| Example 1 | −20° C. | 25,000 | 0.38 w % | 0 mm | 0.822 |
| Example 2 | −10° C. | 25,000 | 0.38 w % | 0 mm | 0.825 |
| Example 3 | −5° C. | 25,000 | 0.38 w % | 0 mm | 0.823 |
| Example 4 | −2° C. | 25,000 | 0.38 w % | 0 mm | 0.825 |
| Example 5 | 0° C. | 25,000 | 0.38 w % | 0 mm | 0.824 |
| Example 6 | −20° C. | 28,000 | 0.38 w % | 0 mm | 0.824 |
| Example 7 | −20° C. | 30,000 | 0.38 w % | 0 mm | 0.822 |
| Example 8 | −20° C. | 25,000 | 0.45 w % | 0 mm | 0.825 |
| Example 9 | −20° C. | 25,000 | 0.35 w % | 0 mm | 0.824 |
| Example 10 | −20° C. | 25,000 | 0.38 w % | 0 mm | 0.823 |
| Example 11 | −20° C. | 25,000 | 0.38 w % | 0 mm | 0.823 |
| Comp. Ex. 1 | 5° C. | 25,000 | 0.38 w % | 8 mm | 0.818 |
| Comp. Ex. 2 | 10° C. | 25,000 | 0.38 w % | 10 mm | 0.819 |
| Comp. Ex. 3 | 20° C. | 25,000 | 0.38 w % | 10 mm | 0.817 |
| Comp. Ex. 4 | −20° C. | 32,000 | 0.38 w % | 8 mm | 0.805 |
| Comp. Ex. 5 | −20° C. | 40,000 | 0.38 w % | 9 mm | 0.802 |
| Comp. Ex. 6 | −20° C. | 25,000 | 0.33 w % | 10 mm | 0.800 |
| Comp. Ex. 7 | −20° C. | 25,000 | 0.20 w % | 12 mm | 0.799 |
| Comp. Ex. 8** | −20° C. | 25,000 | 0 | 10 mm | 0.795 |

*WAMW: Weight average molecular weight
**Polyurethane containing no —SO₃M group

As is apparent from the results in the table, the squareness ratio is little changed even if no polyurethan having a glass transition point of lower than 0° C. is used, while the head rapping can not be restrained if the glass transition point exceeds 0° C. Further, where the polyurethane has a weight average molecular weight of not more than 30,000 and the polar group's S atom content of the polyurethane is not less than 0.35% by weight, the dispersibility of magnetic powder and the angular ratio can be improved.

what is claimed is:

1. A magnetic recording medium having a magnetic layer comprising a ferromagnetic powder and a polyurethane resin having a glass transition point of not higher than 0° C., and a weight average molecular weight of 20,000 to 28,000, and contains a —SO₃M group, wherein M is a hydrogen atom or alkali metal atom, in an amount of 0.37 to 0.5% by weight in terms of sulfur atom.

2. The recording medium of claim 1, wherein said polyurethane resin resin has a glass transition point of from −10° C. to −50° C.

3. The recording medium of claim 1, wherein said magnetic layer further comprises a vinyl chloride copolymer.

4. The recording medium of claim 3, wherein the ratio of said polyurethane resin to said vinyl chloride copolymer is 90:10 to 10:90.

5. The recording medium of claim 4, wherein the ratio of said polyurethane resin to said vinyl chloride copolymer is 70:30 to 30:70.

* * * * *